United States Patent [19]

Sleep

[11] Patent Number: 4,603,639
[45] Date of Patent: Aug. 5, 1986

[54] TRAFFIC CONTROL DEVICE FOR DRIVERLESS VEHICLES

[75] Inventor: Craig F. Sleep, Bangor, Pa.

[73] Assignee: SI Handling Systems Inc., Easton, Pa.

[21] Appl. No.: 608,315

[22] Filed: Mar. 20, 1984

Related U.S. Application Data

[63] Continuation of Ser. No. 328,284, Dec. 4, 1981, abandoned.

[51] Int. Cl.$^4$ ............................................. B61K 7/02
[52] U.S. Cl. ............................... 104/252; 104/166; 104/250; 246/205
[58] Field of Search .............. 104/165, 166, 249, 250, 104/252; 246/205, 206, 207; 74/25, 89, 567, 569

[56] References Cited

U.S. PATENT DOCUMENTS

| | | | |
|---|---|---|---|
| 3,696,756 | 10/1972 | Elmore et al. | 104/252 X |
| 3,818,837 | 6/1974 | Jacoby et al. | 104/166 |
| 3,903,810 | 9/1975 | Jones | 104/166 |
| 4,041,873 | 8/1977 | Jones | 104/166 X |
| 4,048,923 | 9/1977 | Giraud | 104/165 X |
| 4,347,792 | 9/1982 | Nagahori | 104/249 X |
| 4,348,961 | 9/1982 | Rohrbach | 104/252 |

FOREIGN PATENT DOCUMENTS 15406 of 1906 United Kingdom ............... 246/205

*Primary Examiner*—Randolph A. Reese
*Attorney, Agent, or Firm*—Seidel, Gonda, Goldhammer & Abbott

[57] ABSTRACT

The device controls the speed of a driverless vehicle by way of a cam having an acceleration surface and a deceleration surface for contact with a cam follower on the driverless vehicle. The cam is mounted for reciprocation in a horizontal direction between an operative position wherein the deceleration surface will cause a driverless vehicle to stop and an inoperative position wherein the cam will not cause such vehicle to stop.

10 Claims, 6 Drawing Figures

TRAFFIC CONTROL DEVICE FOR DRIVERLESS VEHICLES

This is a continuation of application Ser. No. 328,284, filed 12-4-1981, now abandoned.

BACKGROUND

For background with respect to the type of driverless vehicles involved herein, see U.S. Pat. No. 3,818,837. For background with respect to the type of traffic control devices involved herein, see U.S. Pat. No. 3,903,810. The present invention is directed to an improvement over the device disclosed in said U.S. Pat. No. 3,903,810.

SUMMARY OF THE INVENTION

The present invention is directed to a traffic control device for controlling the speed of a driverless vehicle. The device includes a support on which is mounted a cam. The cam has an acceleration surface and a deceleration surface for contact with a cam follower on a driverless vehicle. The cam is mounted on the support for reciprocation in a horizontal direction relative to the support between an operative position and an inoperative position. In the operative position the decleration surface will cause a driverless vehicle to stop. In the inoperative position, said cam will not cause a vehicle to stop but may cause a vehicle to slow down. A motor means is connected to the cam for reciprocating the cam between said positions.

It is an object of the present invention to provide a novel traffic control device for use with driverless vehicles.

It is another object of the present invention to provide a traffic control device which will cause a driverless vehicle to stop when the device is in one position and which will merely cause a vehicle to slow down when the device is in another position.

Other objects and advantages will appear hereinafter.

For the purpose of illustrating the invention, there is shown in the drawing a form which is presently preferred; it being understood, however, that this invention is not limited to the precise arrangements and instrumentalities shown.

DETAILED DESCRIPTION

Figure 1:
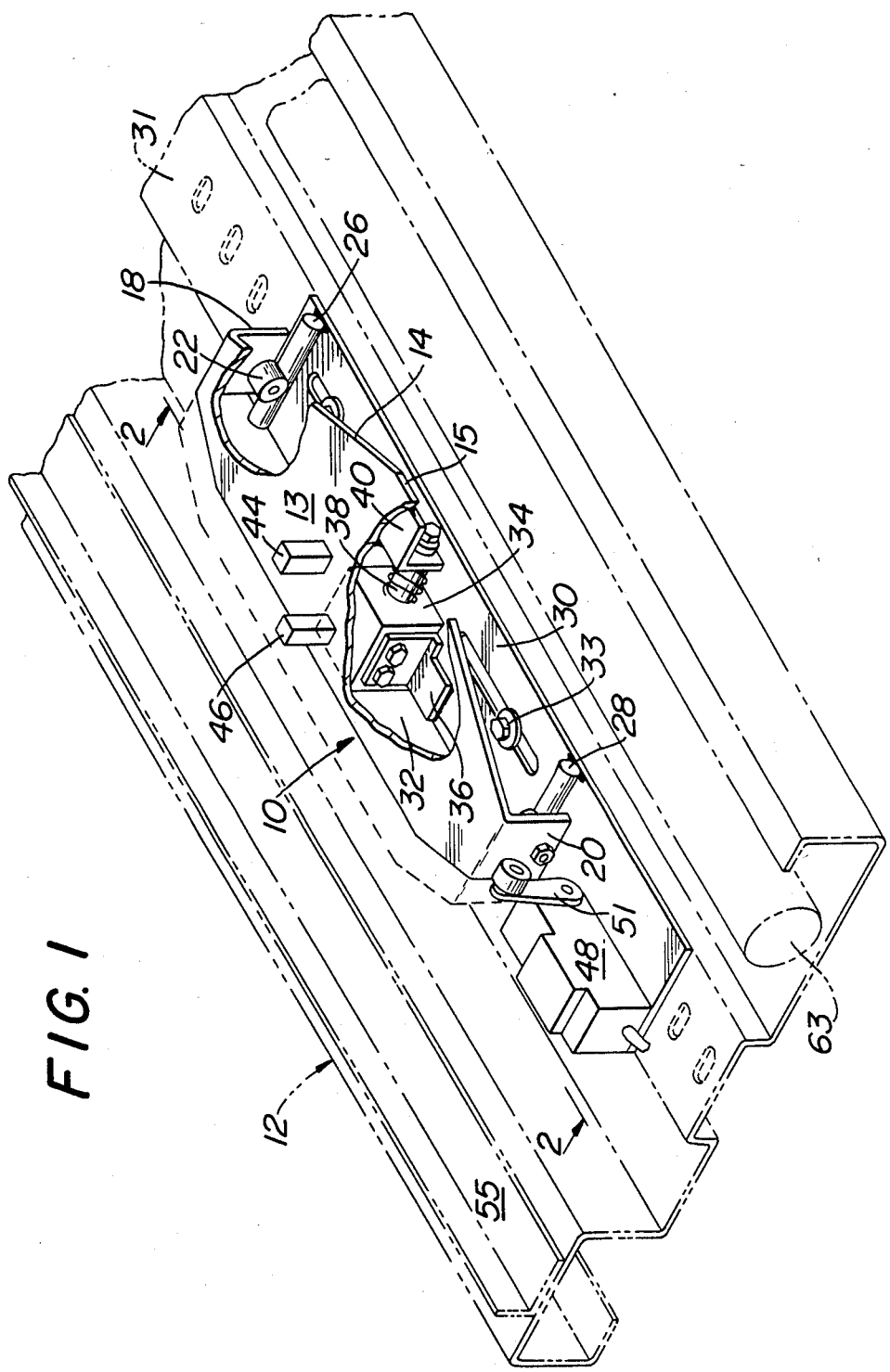
FIG. 1 is a perspective view of a track on which is mounted the traffic control device of the present invention with portions broken away for purposes of clarity of illustration.

Referring to the drawings in detail, wherein like numerals indicate like elements, there is shown in FIG. 1 a traffic control device in accordance with the present invention designated generally as 10 and mounted on a track designated generally as 12. The device 10 includes a cam 13 having a deceleration surface 14, a dwell surface 15, and an acceleration surface 16.

Cam 13 is made from sheet metal with ends bent downwardly so as to define flanges 18 and 20. Flange 18 rotatably supports a roller 22 for rotation about a horizontal axis. Flange 20 similarly supports a roller 24. Roller 22 rides on a rail 26. Roller 24 rides on a rail 28. The rails 26, 28 are fixedly secured in any convenient manner, such as by welding, to a baseplate 30. Baseplate 30 is removably secured to a central horizontally disposed web 31 of the track 12 by bolts 33.

A cylinder 34 is removably bolted to a bracket 36. Bracket 36 has one leg fixedly secured to the baseplate 30 in any convenient manner such as by welding. Cylinder 34 has a piston therein connected to the piston rod 38 which extends from opposite ends of cylinder 34. Piston rod 38 is adjustably connected at one end to a bracket 40 attached to a lower surface of the cam 13. A spring 39 surrounds the piston rod 38 and biases the cam 13 to an operative position.

Figure 2:
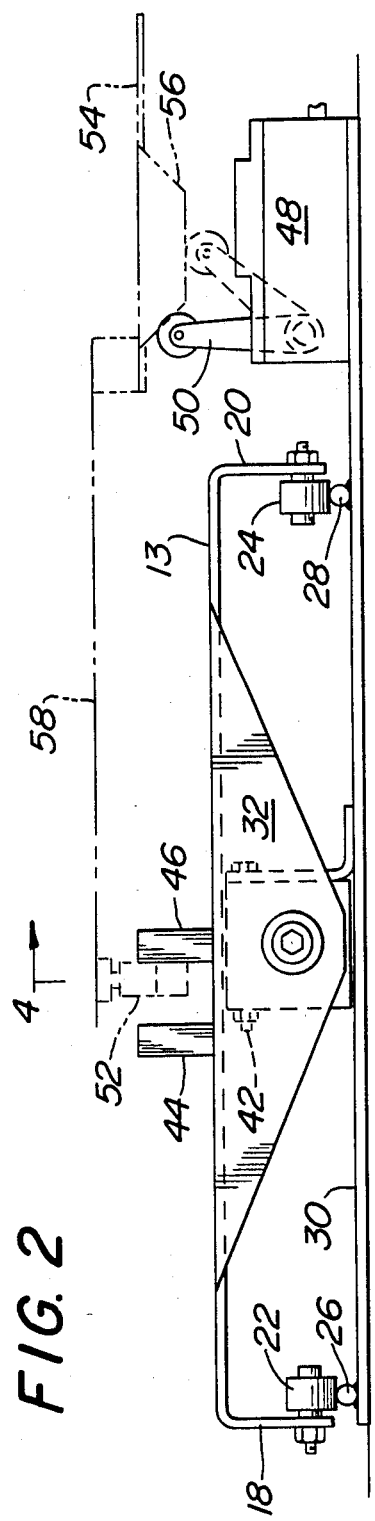
FIG. 2 is a side view as seen along the lines 2—2 in FIG. 1.
Figure 3:
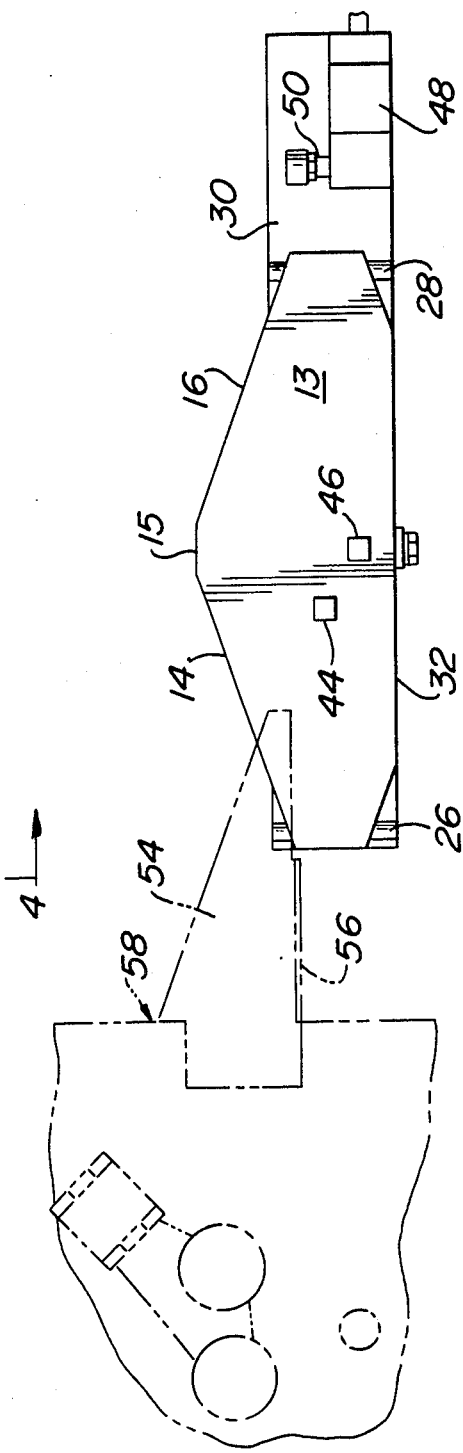
FIG. 3 is a top plan view of the device shown in FIG. 2 but on a smaller scale and with a representation of an approaching driverless vehicle shown in phantom.

As shown more clearly in FIG. 2, the cam 13 on an edge opposite from dwell surface 15 is provided with a downwardly extending flange 32. Flange 32 is bolted to the other end of piston rod 38. Thus, piston rod 38 is the means for connecting cam 13 to the baseplate 30. An inlet 42 is provided for introducing pressurized air into the cylinder 34 to facilitate stroking the cam 13 to an inoperative position and thereby compressing the spring 39 surrounding the piston rod 38. The cam 13 on its upper surface is provided with two upstanding limit stops 44 and 46 which are offset from one another and spaced different distances from the flange 32. Downstream from the cam 13, there is mounted on the baseplate 30 a microswitch or valve 48 having an actuator 50.

A typical vehicle which can be controlled by the traffic control device 10 in the present invention is designated generally as 58. The vehicle 58 has support wheels 59 on one side for riding on a rail 55 on the track 12 with drive wheels on the other side for frictional contact with a driveshaft 63 which propels the vehicle along the track 12. The vehicle 58 includes a downwardly extending limit stop 52. See FIG. 4. The limit stop 52 is preferably a pair of rollers adapted to cooperate with the limit stop 46 on the cam 13 as will be made clear hereinafter. The vehicle 58 includes an accumulation cam 54 having a downwardly extending cam 56. Cam 56 is adapted to contact the actuator 50.

Figure 5:
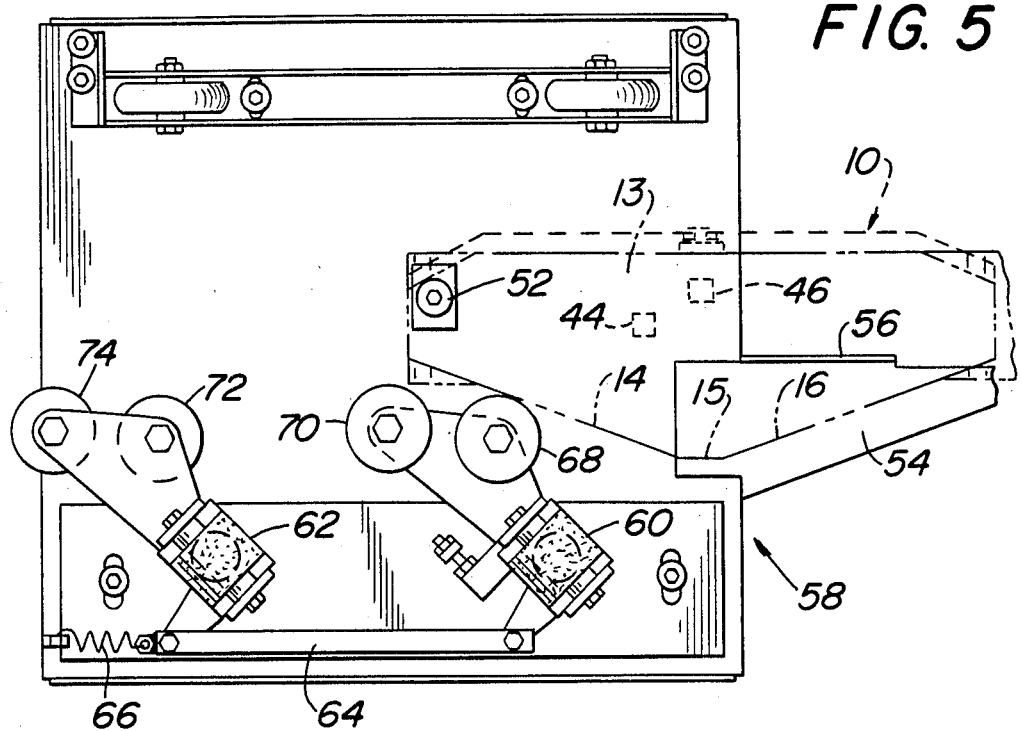
FIG. 5 is a bottom plan view of a driverless vehicle approaching the traffic control device of the present invention.
Figure 6:
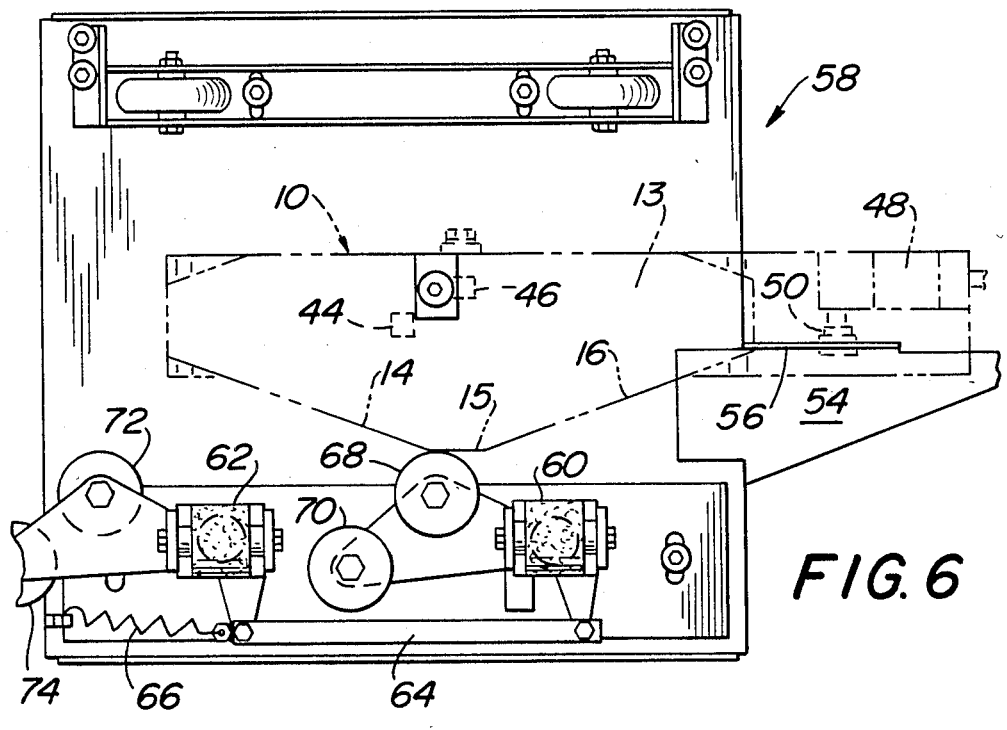
FIG. 6 is a view similar to FIG. 5 but showing the vehicle in a stopped position.

Referring to FIGS. 5 and 6, the vehicle 58 has drive wheels 60 and 62 supported by mounts adapted to oscillate about a vertical axis through an arc of 45°. The mounts are coupled together by a connecting rod 64 which in turn is biased to an operative drive position by the spring 66.

The mount for the drive wheel 60 has a horizontally disposed bracket supporting a pair of cam followers 68, 70 on a lower surface thereof. The mount for drive wheel 62 supports a pair of cam followers 72, 74 on an upper surface thereof. Thus, the respective sets of cam followers are of different elevations.

The operation of the device of the present invention is as follows. The vehicle 58 is propelled by the driveshaft 63 along the track 12 at a uniform speed. If it is desired to cause a vehicle to stop at the device 10, the cylinder 34 is not pressurized. As the cam followers 68 and 70 contact the deceleration surface 14, the mounts for the drive wheels 60, 62 are pivoted from the position shown in FIG. 5 to the position shown in FIG. 6 whereby the vehicle comes to a halt. At the same time, the cam 56 trips the actuator 50 on the switch 48 to thereby signal to a control panel not shown that the vehicle has come to a halt.

Figure 4:
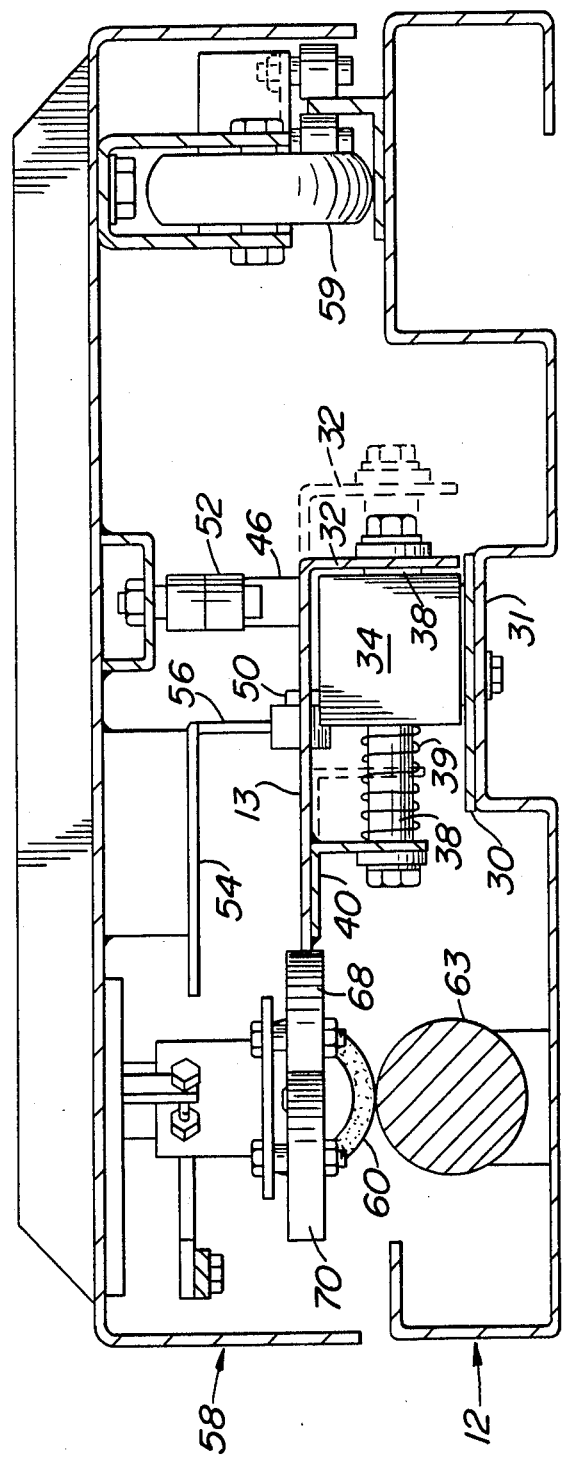
FIG. 4 is a sectional view taken along the line 4—4 in FIG. 2 but on an enlarged scale.

When the control panel supplies pressurized air to the cylinder 34, piston rod 38 retracts the device 10 from the position shown in FIG. 5 thereby shifting the cam 13 from the solid line position shown in FIG. 4 to the phantom position shown in FIG. 4. As a result of such movement the drive wheels 60, 62 are oscillated, by means of spring 66 and connecting rod 64, about vertical axes and the vehicle 58 starts to move forwardly. The cam followers 68 and 70 follow the contour of the acceleration surface 16 to thereby control the speed with which the vehicle will commence moving. When the cam followers lose contact with the cam 13, the vehicle will be at maximum speed which will remain constant until the vehicle 58 contacts the next cam along the track 12. When the cam followers 68 and 70 have lost contact with the accleration surface 16, the spring 39 surrounding the piston rod 38 expands and returns the cam 13 to its operative position.

If desired, the cylinder 34 may remain unpressurized so as to cause the next vehicle to repeat the above process and come to a stop. If desired, the device 10 of the present invention can permit vehicles to pass without causing the vehicles to stop. Thus, a vehicle 58 moving along the track 12 will only slow down as it shifts the cam 13 from the solid line position to the phantom position in FIG. 2 and thereafter will immediately accelerate to maximum speed without coming to a stop along the dwell surface 15. Thus, when pressurized air is being communicated to the cylinder 34, vehicles will merely slow down and then speed up again as they traverse the area of device 10. Each time a vehicle traverses the area of device 10, the switch 48 will be tripped.

Thus, it will be seen that the present invention includes a traffic control device which reciprocates horizontally between an operative position wherein a vehicle will be caused to stop. The amount of horizontal travel of the cam 13 may be quite short such as 2 to 4 centimeters. Because the device 10 reciprocates horizontally, the entire track 12 has a low profile. As will be apparent from FIG. 4, the elevation of cam 13 is slightly above the elevation of the track 12.

When a vehicle has come to a complete stop as shown in FIG. 6, the limit stop 52 depending downwardly from the deck of the vehicle 58 will contact the limit stop 46 on cam 13. When the cam 13 is shifted to its inoperative position, limit stop 46 will move out of the way of limit stop 52 while at the same time limit stop 44 will move to a position wherein it blocks the limit stop 52 so that the vehicle cannot move rearwardly. Thus, the use of two fixed limit stops on the cam 13 is a safety feature.

The control device 10 can be preassembled on baseplate 10 for rapid attachment to the track 12 via bolts 33. If the device 10 is inoperative, it can be rapidly replaced. The use of bar stock for the rails 26, 28 renders them self cleaning and minimizes the force need to move device 10. The surfaces 14 and 16 on control device 10 can cause vehicle 58 to decelerate over a short linear distance of 20-22 centimeters.

The present invention may be embodied in other specific forms without departing from the spirit or essential attributes thereof and, accordingly, reference should be made to the appended claims, rather than to the foregoing specification, as indicating the scope of the invention.

I claim:

1. A traffic control device for controlling the speed of a driverless vehicle comprising a stationary elongated base plate on which is mounted a cam, said cam having a vertically disposed deceleration surface on a side face thereof for contact with a cam follower on a driverless vehicle, said cam being mounted on said base plate for reciprocation in a horizontal direction perpendicular to the lengthwise dimension of the base plate between an operative position wherein said deceleration surface can cause a driverless vehicle to decrease speed and an inoperative position wherein said cam will not cause said vehicle to decrease speed, guide means on said base plate for guiding said movement of said cam, selectively operable motor means on said base plate for reciprocating said cam along said direction from one of said positions to the other position, said motor means including a cylinder having a piston therein and a piston rod connecting to said piston and to said cam, said piston rod and guide means extending in said direction, and stop means fixed to and projecting upwardly from said cam and adapted to selectively contact a vehicle whose speed was reduced by contact with said cam surface when the cam is in the operative position and adapted to contact a vehicle to prevent reverse movement thereof when the cam is withdrawn to the inoperative position.

2. A device in accordance with claim 1 including a switch mounted on said plate and having an upstanding actuator adapted to be contacted by a driverless vehicle.

3. A device in accordance with claim 1 including a spring biasing said cam to said operative position.

4. A device in accordance with claim 1 wherein said guide means includes a pair of rails on said base plate, each rail being in rolling contact with a roller supported by said cam.

5. A traffic control device for controlling the speed of a driverless vehicle comprising a support on which is mounted a cam, said cam having an acceleration surface and a deceleration surface for contact with a cam follower on a driverless vehicle, said cam being mounted on said support for reciprocation in a horizontal direction relative to said support being an operative position wherein said deceleration surface can cause a driverless vehicle to stop and an inoperative position wherein said cam will not cause said vehicle to stop, motor means connected to said cam for reciprocating said cam from one of said positions to the other position, and a pair of offset upstanding fixed limit stops on said cam.

6. A device in accordance with claim 5 wherein said cam is a metal member having end walls connected to a top wall, a vertical edge of said top wall constituting said acceleration and deceleration surfaces, said cam being guided for reciprocation by members supported by said end walls and mating members on said base plate.

7. A traffic control device for controlling the speed of a driverless vehicle comprising an elongated base plate adapted to be secured to a track, a cam having a dwell surface between an acceleration surface and a deceleration surface for contact with a cam follower on a driverless vehicle, said base plate supporting said cam for reciprocation in a horizontal direction transversely of the length of said base plate, motor means mounted on said base plate and connected to said cam for reciprocating said cam from an operative position to an inoperative position, means biasing said cam to an operative position wherein said surfaces will be located for controlling the speed of a driverless vehicle, said motor means including a cylinder with a piston rod extending from opposite ends thereof, the longitudinal axis of said piston rod extending along said direction, each end of said piston rod being connected to said cam.

8. A traffic control device for controlling the speed of a driverless vehicle comprising an elongated base plate adapted to be secured to a track therebelow, a cam having a dwell surface between an acceleration surface and a deceleration surface on a side edge of the cam for contact with a cam follower on a driverless vehicle, said base plate supporting said cam for reciprocation in a horizontal direction transversely of the length of said base plate, a motor means mounted on said base plate and connected to said cam for reciprocating said cam from an operative position to an inoperative position, said motor means including a cylinder with a piston rod extending from opposite ends thereof, the longitudinal axis of said piston rod extending along in said direction, each end of said piston rod being connected to said cam, and means biasing said cam horizontally to an operative position wherein said surface thereon will be located for controlling the speed of a driverless vehicle when said motor is inoperative.

9. A device in accordance with claim 8 including a pair of spaced rails transversely on said baseplate, each rail having a curved peripheral contact surface, said cam having a pair of rollers thereon, each roller being in rolling contact with a curved surface on one of said rails.

10. A device in accordance with claim 8 including a switch on said baseplate and having an upstanding actuator for contact with a driverless vehicle.

* * * * *